Nov. 12, 1940. C. C. KESLER 2,221,484
METHOD FOR BONDING SURFACES
Filed Feb. 21, 1938

Inventor:
Carl C. Kesler,
By Chritton, Wiles, Davies, Hirschl & Dawson
Attorneys Patented Nov. 12, 1940

2,221,484

UNITED STATES PATENT OFFICE 2,221,484

METHOD FOR BONDING SURFACES

Carl C. Kesler, Cedar Rapids, Iowa, assignor to Penick & Ford, Ltd., Incorporated, Cedar Rapids, Iowa, a corporation of Delaware Application February 21, 1938, Serial No. 191,759

10 Claims. (Cl. 154—40)

This invention relates to a bonding method and more particularly to a method for bonding surfaces such as, for example, paper, corrugated board, etc.

It is well known that in the bonding of paper surfaces such as, for example, in the form of a corrugated board, the starch adhesive tends to penetrate the paper, producing an unsatisfactory result. Borax has been used with starch to produce a quick gel and prevent penetration of the paper. However, when borax is used with heavy cooked starch, the gel is so quickly accomplished that it is impossible to spread the glue evenly over the surface. If the borax is used with a highly modified starch, it does not have sufficient bonding strength to be satisfactory as an adhesive. Borax has heretofore been used with ungelatinized starches, but this process requires the cooking of the starch in situ. It is a recognized fact in the starch-adhesive field that, on an equal percentage basis, the heavy-bodied or cooked starches give the greatest strength to the bond.

An object of this invention is to provide a method by which cooked starches may be employed as a bond and in conjunction with borax, while at the same time preventing excessive penetration of the paper layers. A further object is to provide a method by which heavy cooked starches may be employed to effect a quick setting bond of a high strength. A further object is to provide a simple and effective method for bonding paper layers, uniform and high strength being produced in the bond through the use of borax-starch solutions in combination with cooked starch and ingredients employed therewith. Other specific objects and advantages will appear as the specification proceeds.

The invention is illustrated in a single embodiment by the accompanying drawing, in which—

Figure 1:
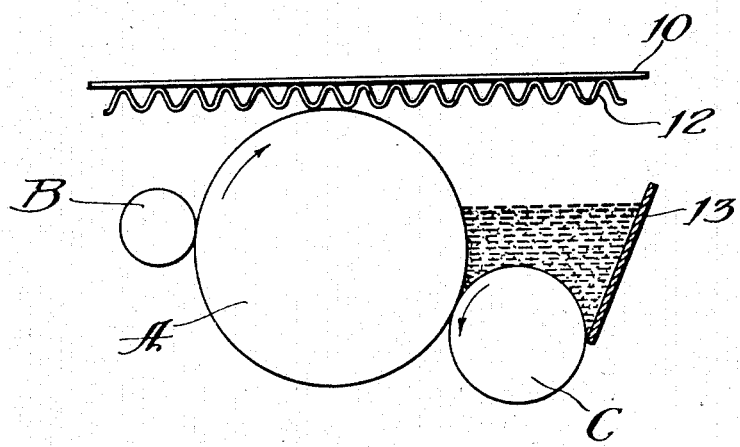
Figure 2:
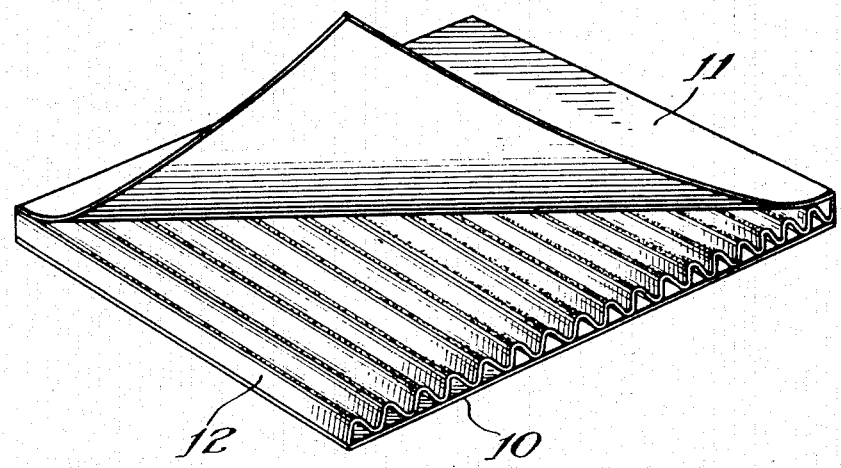

Figure 1 shows an elevational and diagrammatic view of apparatus for applying heavy cooked starch to the corrugated board; and Fig. 2, a perspective view of a corrugated board partially completed, the same being formed in accordance with my invention.

In the illustration given, A designates a large applying roller engaging one side of an inner corrugated strip; B designates a roller which is stationary or which rotates at slower speed than roller A for smoothing the adhesive layer upon the roller A; and C, designates a roller which aids in applying heavy cooked starch to the roller A.

The corrugated board, as illustrated in Fig. 2, is formed by bonding the liners 10 and 11 to the inner corrugated strip 12. In the illustration given in Fig. 1, the roller A is shown applying adhesive to the outer surface of the corrugated strip 12.

Cooperating with the roller or agitator C is a partition member 13 which forms with sides (not shown) and together with the rollers A and C, a compartment for holding the glue. The heavy cooked starch glue, which is too heavy to be received normally by roller A, is agitated by the roller C and is applied thereby to the surface of the roller A. The stationary or slow moving roller B tends to prevent the heavy glue from forming rills or rings and results in bringing about a uniform application of the adhesive to the liner 12.

I have discovered that cooked starch, and even heavy-bodied cooked starch, so heavy that it ordinarily cannot be applied for adhesives, may be effectively used for producing a bonding of paper strips in forming corrugated board, solid wallboard, laminated board, etc., by first applying to one of the surfaces to be joined and prior to contact with the heavy-bodied starch, a solution of borax, and preferably a solution of borax and a thickening agent, as for example, a carbohydrate such as starch. For example, a solution containing from ½ of 1% to 5% of starch and from 2% to approximately 5% borax has been found satisfactory, although greater or lesser amounts may be employed. If desired, the borax may be applied alone. However, it is found that the borax-starch solution can be applied mechanically more evenly and limits the penetration of the borax and the subsequently applied adhesive into the surface to be bonded.

After treatment with the borax or borax and starch, I apply to the surface a heavy-bodied cooked starch which may, if desired, contain other chemicals, such as caustic soda or lime. The starch may be applied in any desired way or by any desired means. The apparatus illustrated in Fig. 1 is well adapted for applying such heavy-bodied starch. The cooked starch, coming in contact with the borax, sets to a gel, and bonds securely and quickly the outer lining to the inner corrugated strip. The action of borax, in conjunction with the heavy-bodied cooked starch, speeds the setting so much that the board is bonded by the time it reaches the slitters and cutoff knife at the end of the usual board-making machine, even when the board is made at top speed.

It will be understood that the borax or borax-starch solution may be applied in a number of ways. For example, it may be applied by a roller to either an inner corrugated strip or to the liners. If desired, the borax may be applied to any of the sheets in the paper mill at the time that the sheet is made. The application can be made on the calendar stack, making use of the water boxes and the sheet may be treated on one or both sides, as desired.

The composition of the heavy cooked starch may vary within wide limits. While from ¼% to 2% of caustic soda may be employed, this amount may be increased or decreased while still obtaining satisfactory results.

As a specific example, I may set forth the following. A roller is employed to apply to the surface of a corrugated sheet a solution containing 2% of starch and 5% of borax. Afterwards, a heavy-bodied cooked starch of 15% concentration and containing .5% of caustic soda is applied to one of the surfaces to be bonded. The two surfaces are then brought together and pressed to unite them in a secure and complete bond.

While a substantial advantage of the invention is the ability to use heavy cooked starch, it will be understood that the invention may be used with starches which are modified but not too greatly modified. Whether a heavy-bodied cooked starch or a not greatly modified starch is employed, a quick setting bond is obtained and a stronger bond is secured with the same dry substance or an equal strength with less dry substance.

By the new method set out in which a borax solution or borax-starch solution is preliminarily employed for wetting the surfaces to be bonded and thereafter a heavy-bodied starch applied to the surface, it is found that new and very advantageous results are obtained. Substantially all of the elements cooperate in producing a much better bond and product. In the first place, the heavy-bodied starch does not penetrate the paper. In the second place, the heavy cooked starch body cooperates with the borax to form a stronger bond than that obtained heretofore. In the third place, the heavy-bodied starch cooperates with the borax in producing a quick setting whereby the machine can be run at top speed, the bonding being effectively completed before the board reaches the slitters, etc.

While in the foregoing description, I have set forth certain steps and materials, it will be understood that the details with respect thereto may be modified widely without departing from the spirit of my invention. The foregoing detailed description has been given for clearness of understanding only, and no unnecessary limitations should be understood therefrom, but the appended claims should be construed as broadly as permissible, in view of the prior art.

I claim:

1. In a process of the class described for bonding two surfaces, the steps of applying borax to at least one surface, applying cooked starch to at least one of said surfaces, and then bringing said surfaces into contact to effect a bond therebetween.

2. In a process of the class described for bonding two surfaces, the steps of applying borax to at least one of said surfaces, applying cooked starch having a concentration in the neighborhood of 15% to at least one of said surfaces, and then bringing said surfaces into contact to effect a bond therebetween.

3. In a process of the class described for bonding two surfaces, the steps of applying borax to at least one surface, applying cooked starch having a concentration greater than 15% to at least one of said surfaces, and then pressing said surfaces together to effect a bond therebetween.

4. In a process in which an inner corrugated sheet is bonded to liner sheets through the use of starch adhesive, the steps of treating at least one of each pair of surfaces to be joined with borax, applying cooked starch to at least one of each of said pair of surfaces, and then bringing said surfaces into contact to effect a bond between said liner sheets and said inner corrugated sheet.

5. In a process in which surfaces are bonded through the use of starch adhesive, the steps of treating at least one of the surfaces to be joined with a solution of dilute starch and borax, applying cooked starch to at least one of said surfaces, and then bringing said surfaces into contact to effect a bond therebetween.

6. A process as set out in claim 5 in which the starch ingredient constitutes from ½ of 1% to 5% of the solution and in which the borax ingredient constitutes from 2% to 5% of the solution.

7. In a process in which surfaces are bonded through the use of starch adhesive, the steps of treating at least one of the surfaces to be joined with a solution containing starch and borax, the starch being in the neighborhood of 2% and the borax being in the neighborhood of 5%, applying cooked starch to at least one of said surfaces, and then bringing said surfaces into contact to effect a bond therebetween.

8. In a process of the class described in which paper sheets are united by starch adhesive, the steps of preliminarily treating at least one of the paper strips with borax at the time that the sheet is formed, later applying cooked starch to one of the surfaces of the sheets, and then uniting said sheets whereby the borax is brought into contact with the cooked adhesive to effect a bond between the paper sheets.

9. A method for the purposes set forth, comprising: first applying borax to at least one of two surfaces to be joined, then applying cooked starch to the borax treated surface, and quickly bringing the two surfaces into contact before a complete gel of the adhesive is effected and pressing the same to bond said surfaces.

10. In a process of the class described for bonding two surfaces, the steps of applying separately a borax solution and a layer of cooked starch, and bringing said surfaces together under pressure whereby the action of the borax solution upon the cooked starch is causing a quick gel thereof is substantially contemporaneous with the pressing together of said surfaces.

CARL C. KESLER.

CERTIFICATE OF CORRECTION.

Patent No. 2,221,484.　　　　　　　　　　　November 12, 1940.

CARL C. KESLER.

It is hereby certified that error appears in the printed specification of the above numbered patent requiring correction as follows: Page 2, second column, line 64, claim 10, for the word "is" read --in--; and that the said Letters Patent should be read with this correction therein that the same may conform to the record of the case in the Patent Office.

Signed and sealed this 10th day of December, A. D. 1940.

(Seal)　　　　　　　　　　　　　　　　　　　　　　Henry Van Arsdale,
　　　　　　　　　　　　　　　　　　　　　　　Acting Commissioner of Patents.